Feb. 6, 1962　　　M. LOSHER　　　3,020,545
RADIO NAVIGATION SYSTEM
Filed Feb. 12, 1958　　　　　　　　　　5 Sheets-Sheet 1

Inventor
MORTON LOSHER
By Philip M. Bolton
Attorney

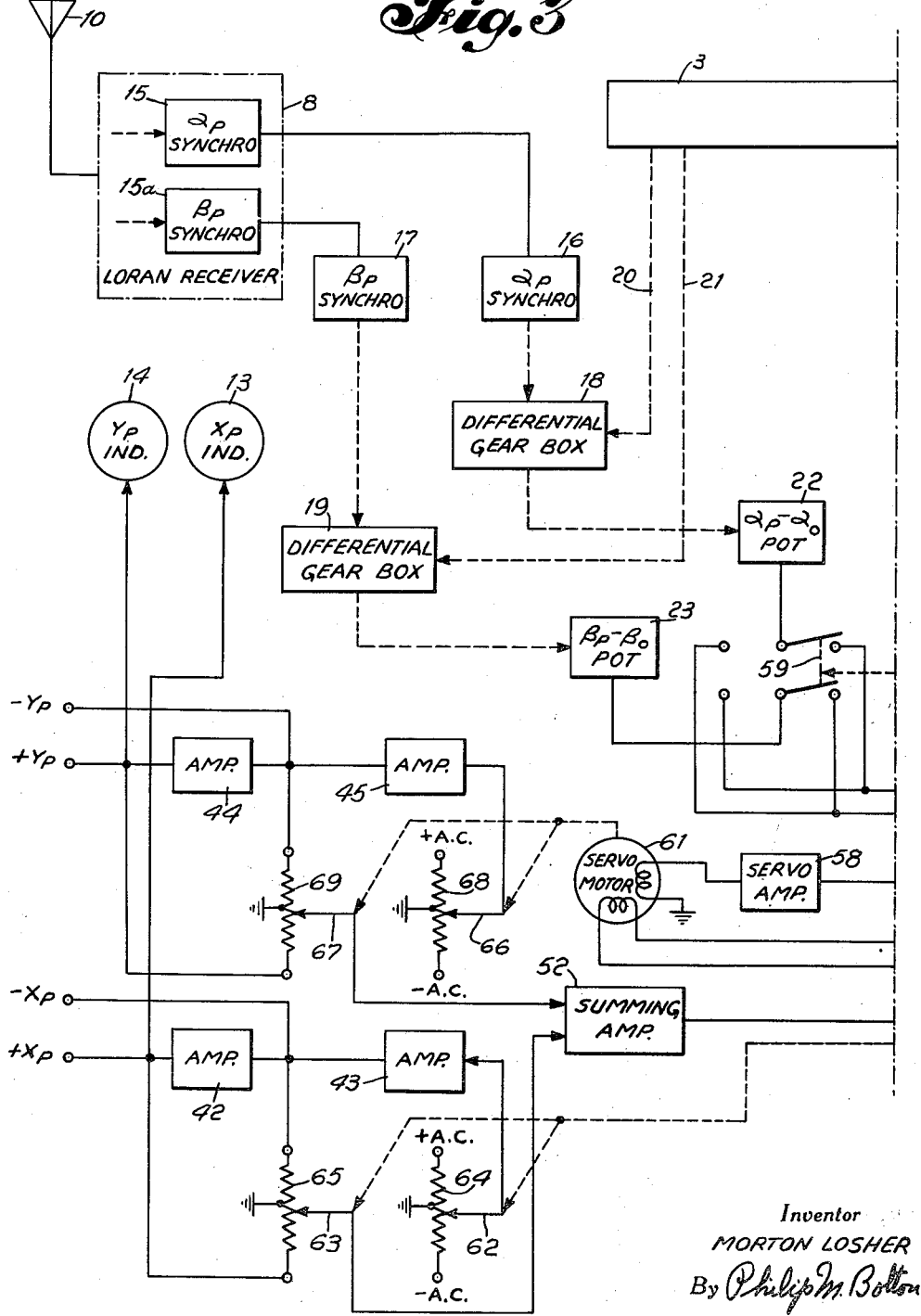

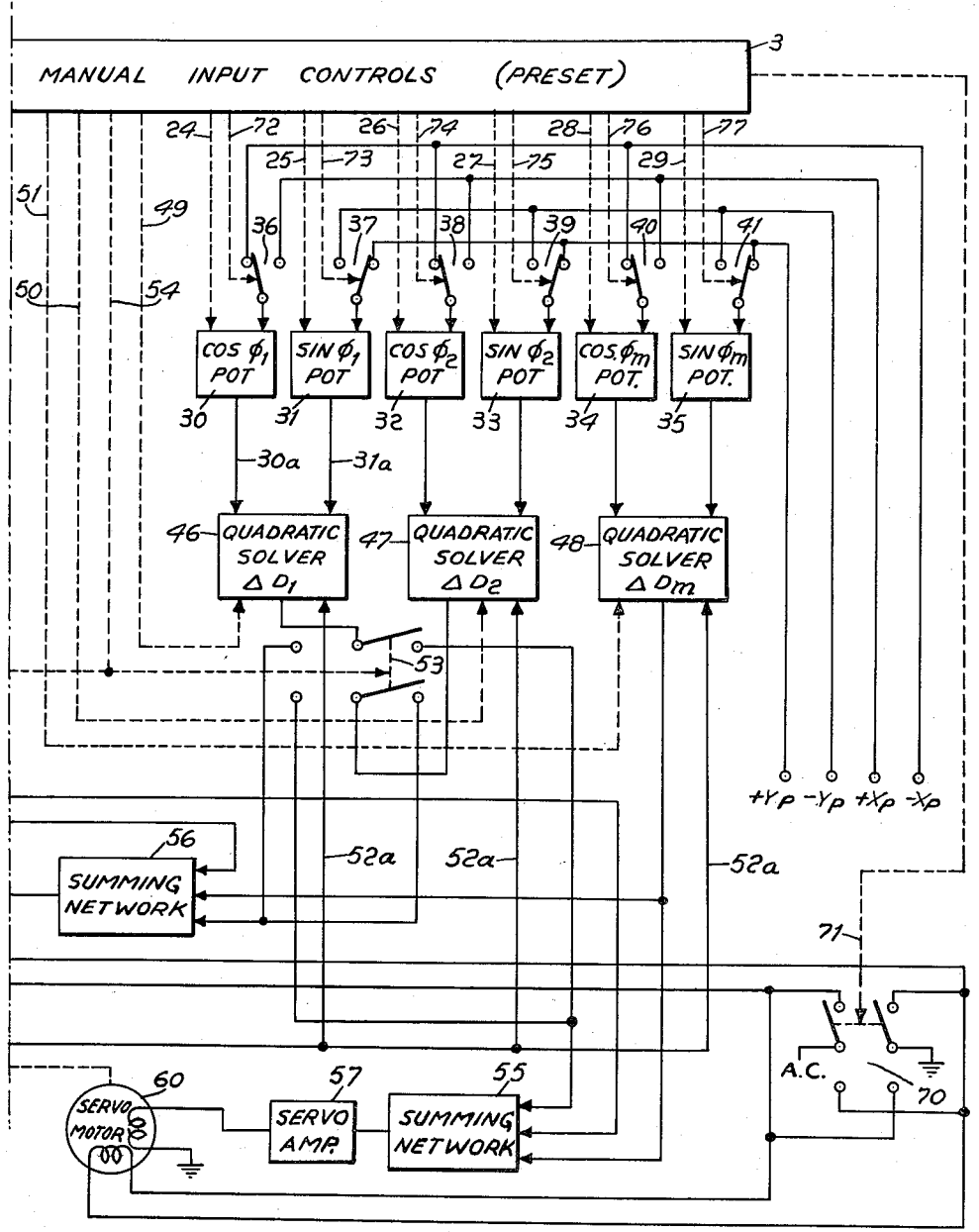

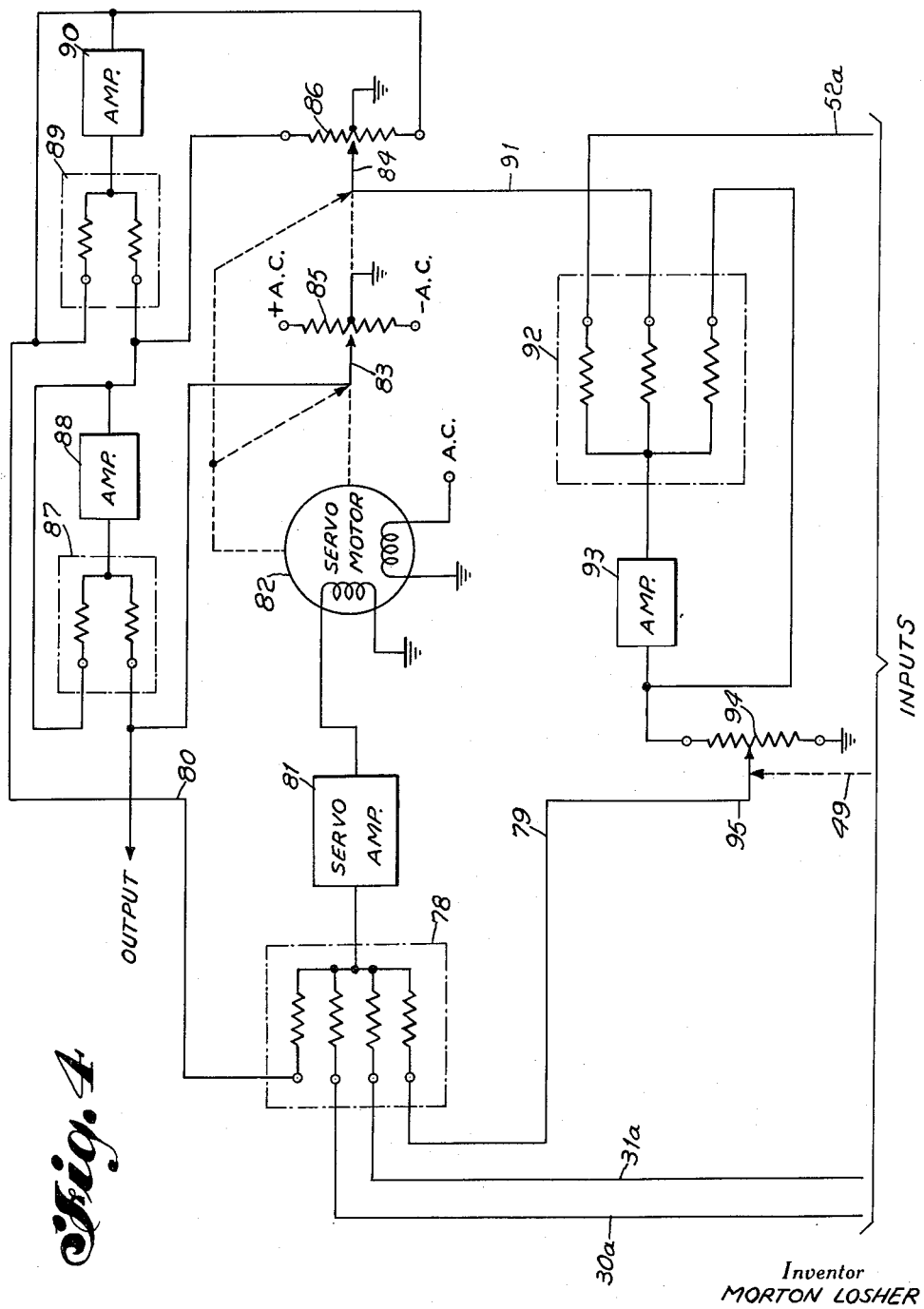

United States Patent Office 3,020,545
Patented Feb. 6, 1962

3,020,545
RADIO NAVIGATION SYSTEM
Morton Losher, Bergenfield, N.J., assignor to International Telephone and Telegraph Corporation, Nutley, N.J., a corporation of Maryland
Filed Feb. 12, 1958, Ser. No. 714,751
6 Claims. (Cl. 343—103)

This invention relates to radio navigation systems and particularly to systems utilizing the time difference in the propagation of radio energy from synchronized beacons to establish distances.

In the past numerous radio navigation systems have been employed which utilize the time difference in propagation of radio wave energy, such as pulses emanating from beacons at a known position and detected by equipment on a craft to establish the position of the craft relative to the beacons. One such prior system commonly called Loran employs pairs of synchronized ground beacons, each beacon of a pair transmitting radio wave pulses at the same rate with precisely fixed time relations between given pulses from each of the beacons of a pair. The pulse repetition rate of the beacons in a pair serves to identify the pair of beacons. In operation the pulses from two or more pairs of such beacons are radiated to a craft or vehicle having radio receiving equipment where an operator by means of this equipment and other equipment establishes two different pulse time differences, one between the pulses from a first pair of beacons and the other between the pulses from a second pair of beacons. Each time difference represents a locus of points forming a hyperbolic line on a special map; thus, the point on the special map where the line representative of the time difference between received pulses from a first pair of beacons and the line representative of the time difference between pulses from a second pair of beacons cross, indicates the position of the craft or vehicle.

One difficulty with the prior radio navigation systems and the Loran system employing special maps is that an operator must obtain information from the receiver, then subsequently transpose this information to a coordinate system on a special map to locate his own position. This process of obtaining information and transposing it is time consuming, and if the operator's craft is moving at an appreciable speed, its position will have changed appreciably between the time the information is received and obtained from the receiver and the time it is transposed to yield position from the special map. Thus the operator is not able to establish the instantaneous position of his craft on the map within the accuracy inherent to the Loran receiver.

Therefore, the primary object of this invention is to provide an improved radio navigation system.

Another object is to provide a navigation system employing a position computer responsive to signals indicative of a craft's position relative to a first known position and responsive also to signals indicative of a second known position relative to said first known position to thereby compute the craft's position relative to said second known position.

Another object of this invention is to provide a navigation system responsive to signals indicative of a craft's position relative to a known position to establish the craft's position relative to another known position, which is preferably nearer to the craft, thereby permitting the system to deal with and compute shorter distances resulting in more accurately locating the position of said craft.

Another object of this invention is to provide a position computer for use with a Loran receiver to establish the position of the receiver relative to a known point.

Another object of this invention is to provide a computer for use with a Loran receiver to rapidly establish the instantaneous position of said receiver relative to a known point in response to signals from said Loran receiver, thereby minimizing the error in position introduced by the craft's velocity.

Another object of this invention is to provide an analog position computer for use with a Loran receiver on a craft and responsive to signals therefrom and manual input signals, to compute said craft's position relative to a known point preferably near the craft.

It is a feature of this invention to employ an analog computer responsive to hyperbolic coordinate signals from a Loran receiver indicative of a craft's position, hyperbolic coordinate signals indicative of a known position and signals indicative of the distance from said known position to the Loran transmitting beacons to compute said craft's position relative to said known position.

Another feature of this invention is to provide analog integrating means to generate forcing function signals indicative of the Cartesian coordinates of said craft's position relative to said known point which may be fed to analog quadratic equation solvers yielding signals indicative of the differences between the craft's distance to each Loran beacon and the distance from said known point to each Loran beacon and to compare these signals indicative of differences with hyperbolic coordinate signals indicative of the craft's position and the position of said known point yielding signals to control said analog integrating means and, thus, control said forcing function signals indicative of said Cartesian coordinates.

Another feature is to provide two separate analog integrating means to produce said Cartesian coordinate signals and to provide three separate analog means to solve three different quadratic equations.

Another feature is to provide means to adjust scale so that the Cartesian coordinate signal output may signify more than one positional displacement of the craft relative to said known position.

Another feature is to provide manual input controls to generate signals indicative of the hyperbolic coordinates of said known point relative to said Loran beacons, the distance from said known point to each Loran beacon and the bearing of said known point to each Loran beacon so that during the course of navigation, said known point may be frequently changed manually.

Other and further objects and features of this invention will be more apparent from the following specific description taken in conjunction with the figures, in which:

FIGS. 3 and 3A are a detail block diagram and electrical schematic of the position computer; and FIG. 4 is a detail schematic of one of the three quadratic equation solvers shown in FIG. 3A.

Figure 1:
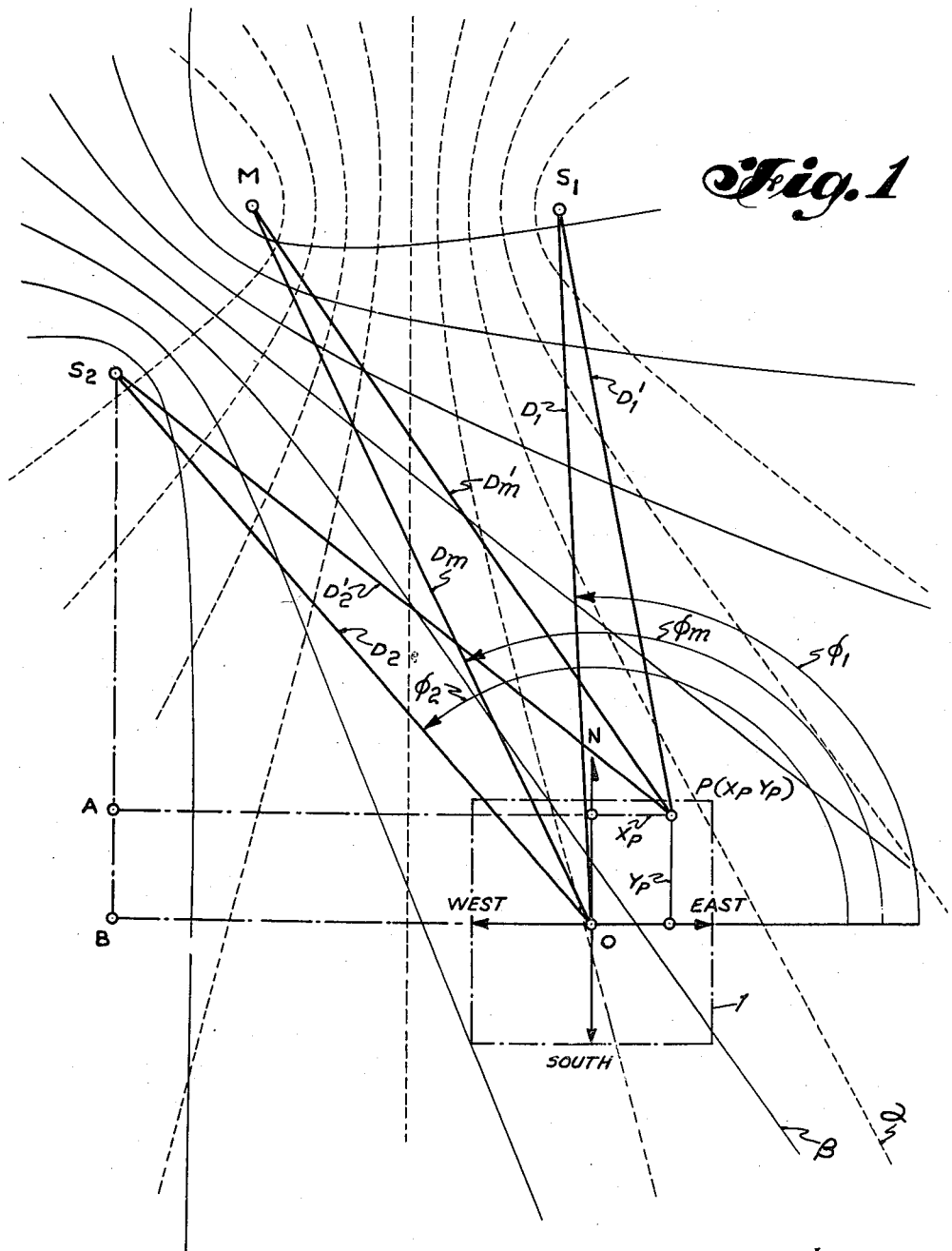
FIG. 1 is a map view of a Loran hyperbolic coordinate signal field from which the geometry and equations computed by the position computer may be better understood.

Referring first to FIG. 1, there are shown three Loran beacons, a master M and slaves $S_1$ and $S_2$, transmitting signals from which two sets of hyperbolic coordinate lines may be established. One set of hyperbolic coordinate lines which are established by signals from beacons M and $S_1$ are shown as broken lines, while the other set of hyperbolic coordinate lines established by signals from beacons M and $S_2$ are shown as solid lines.

If a vehicle containing a Loran receiver is located at point P within range of the beacons M, $S_1$, and $S_2$ at distances $D_m'$, $D_1'$ and $D_2'$ from the beacons, respectively, and it is desired to find the coordinates $X_p$ and $Y_p$ of point P relative to a known point at O and the distances $D_m$, $D_1$ and $D_2$ of point O from beacons M, $S_1$, and $S_2$, respectively, are accurately known, as well as the angles $\phi_m$, $\phi_1$, and $\phi_2$, and the exact hyperbolic coordinates of point O are known, then there is sufficient information available to compute $X_p$ and $Y_p$ thereby locating the craft's position at P relative to the known point O which may be at the center of a small area map 1.

It should be noted that the positions of the Loran beacons as shown in FIG. 1 are arbitrary and the triangle they form is not necessarily a right triangle and, furthermore, the known point O is well outside the triangle formed by the beacon positions. The arbitrary location of the beacons and point O, shown in FIG. 1, is purposely employed to show the versatility of the embodiment of the navigation computer herein described. It might be preferable from the standpoint of accuracy that the beacon positions form a right triangle and that small map 1 be smaller than shown and located within the right triangle formed by the beacons.

In order to show that there is enough information available as outlined in the above paragraph to compute $X_p$ and $Y_p$, consider the following strict derivation of quadratic equations in terms of the precisely known factors outlined in the paragragh above and in terms of $X_p$ and $Y_p$ yielding the factors $\Delta D_m$, $\Delta D_1$, and $\Delta D_2$ which are equivalent by definition to the following:

$$\Delta D_m = D_m' - D_m$$
$$\Delta D_1 = D_1' - D_1$$
$$\Delta D_2 = D_2' - D_2$$

Let $\alpha_p$ and $\beta_p$ be the time differences of radio pulses detected from beacons $S_2$ and M and $S_1$ and M, respectively by the Loran receiver in the craft at P; therefore:

$$\alpha_o = D_1 - D_m$$
$$\beta_o = D_2 - D_m$$
$$\alpha_p = D_1' - D_m'$$
$$\beta_p = D_2' - D_m'$$

Therefore, (1) $\quad \alpha_p - \alpha_o = \Delta D_1 - \Delta D_m$
(2) $\quad \beta_p - \beta_o = \Delta D_2 - \Delta D_m$ and consider triangle (APS$_2$). It follows by the Pythagorean theorem that:

$$(D_2')^2 = (AP)^2 + [(S_2B) - Y_p]^2$$

and:

$$(AP)^2 = (X_p - D_2 \cos \phi_2)^2 \text{ since } \cos \phi_2 \text{ is negative}$$

and:

$$(S_2B) = D_2 \sin \phi_2$$

therefore:

$$(D_2')^2 = (X_p - D_2 \cos \phi_2)^2 + (D_2 \sin \phi_2 - Y_p)^2$$

and by definition:

$$(D_2')^2 = (D_2 + \Delta D_2)^2$$

therefore:

$$(D_2 + \Delta D_2)^2 = (X_p - D_2 \cos \phi_2)^2 + (D_2 \sin \phi_2 - Y_p)^2$$

or:

$$(\Delta D_2)^2 + 2D\Delta D_2 + D_2^2 = X_p^2 - 2X_pD_2 \cos \phi_2 + (D_2 \cos \phi_2)^2 + (D_2 \sin \phi_2)^2 - 2Y_pD_2 \sin \phi_2 + Y_p^2$$

and in this equation:

$$D_2^2 = (D_2 \sin \phi_2)^2 + (D_2 \cos \phi_2)^2$$

thus:

$$\Delta D_2^2 + 2D_2\Delta D_2 = X_p^2 + Y_p^2 - 2X_pD_2 \cos \phi_2 - 2Y_pD_2 \sin \phi_2$$

and by similar analysis the following can be shown:

$$\Delta D_m^2 + 2D_m\Delta D_m = X_p^2 + Y_p^2 - 2X_pD_m \cos \phi_m - 2Y_pD_m \sin \phi_m$$

$$\Delta D_1^2 - 2D_1\Delta D_1 = X_p^2 + Y_p^2 - 2X_pD_1 \cos \phi_1 - 2Y_pD_1 \sin \phi_1$$

and solving the above equations for $\Delta D_2$, $\Delta D_m$ and $\Delta D_1$, the following quadratic equations are obtained:

(3)
$$\Delta D_1 = \frac{1}{2D_1} \cdot (X_p^2 + Y_p^2 - \Delta D_1^2) - X_p \cos \phi_1 - Y_p \sin \phi_1$$

(4)
$$\Delta D_2 = \frac{1}{2D_2} \cdot (X_p^2 + Y_p^2 - \Delta D_2^2) - X_p \cos \phi_2 - Y_p \sin \phi_2$$

(5)
$$\Delta D_m = \frac{1}{2D_m} \cdot (X_p^2 + Y_p^2 - \Delta D_m^2) - X_p \cos \phi_m - Y_p \sin \phi_m$$

Figure 2:
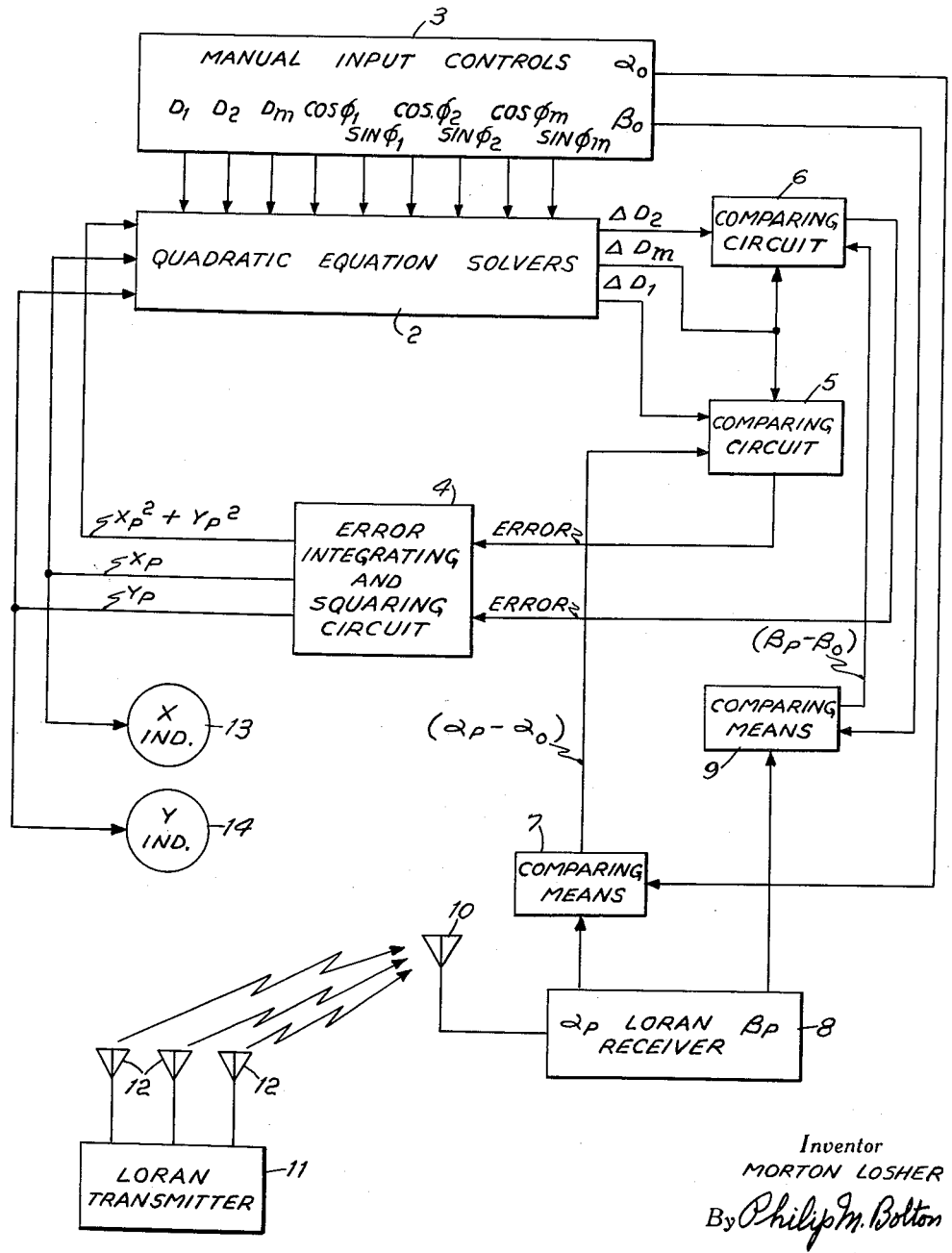
FIG. 2 is a block diagram of the position computer from which a general understanding of its operation may be had.

Referring next to FIG. 2, there is shown a general block diagram of the position computer. The quadratic equation solvers 2 receive signals from the manual input controls 3 which are indicative of the position of point O shown in FIG. 1 relative to the position of the beacons M, $S_1$, and $S_2$, also shown in FIG. 1. Quadratic equation solvers 2 are also fed signals indicative of $X_p$, $Y_p$, and $X_p^2 + Y_p^2$ from error integrating and squaring circuit 4 so that the factors $\Delta D_m$, $\Delta D_1$, and $\Delta D_2$ may be computed by quadratic equation solvers 2. Signals indicative of $\Delta D_1$ and $\Delta D_m$ are fed to comparing circuit 5, while signals indicative of $\Delta D_2$ and $\Delta D_m$ are fed to comparing circuit 6. Comparing circuit 5 is also fed signals indicative of $\alpha_p - \alpha_o$, while comparing circuit 6 is also fed signals indicative of $\beta_p - \beta_o$. These comparing circuits 5 and 6 compute Equations 1 and 2, respectively, yielding output signals indicative of $$\alpha_p - \alpha_o - \Delta D_1 + \Delta D_m$$

and $\beta_p - \beta_o - \Delta D_2 + \Delta D_m$, respectively. The factors $\alpha_p - \alpha_o$ are computed by comparing means 7 in response to $\alpha_o$ from manual input controls 3 and $\alpha_p$ from Loran receiver 8, while the factor $\beta_p - \beta_o$ is obtained from comparing means 9 in response to $\beta_o$ from manual input controls 3 and $\beta_p$ from Loran receiver 8. The Loran receiver 8 receives signals via antenna 10 which are transmitted from the Loran beacon transmitters 11 via antennas 12. The action of error circuit 4 in response to error signals from circuits 5 and 6 is to vary the output signals indicative of $X_p$, $Y_p$, and $X_p^2 + Y_p^2$ fed to quadratic equation solvers 2 until said solvers yield signals indicative of $\Delta D_m$, $\Delta D_1$, and $\Delta D_2$ which when compared in circuits 5 and 6 with the $\alpha$ and $\beta$ signals yield zero error signals. In other words, error circuit 4 varies the values of $X_p$ and $Y_p$ until the error signals from circuits 5 and 6 are nulled. The $X_p$ and $Y_p$ indicators, 13 and 14 respectively, coupled to circuit 4, are provided to indicate the coordinates of the craft's position relative to known point O.

Referring next to FIGS. 3 and 3A, there is shown a detail diagram of the position computer. In operation signals from beacons M, $S_1$, and $S_2$ are detected by antenna 10 and fed to Loran receiver 8 wherein $\alpha_p$ and $\beta_p$ signals are computed as shaft rotations and coupled to synchros 15 and 15a, respectively, which in turn energize synchros 16 and 17, respectively, whose output shaft positions are applied to differential gear boxes 18 and 19, respectively. Shaft rotations 20 and 21 from manual controls 3, indicative of $\alpha_o$ and $\beta_o$, respectively, are applied to gear boxes 18 and 19, respectively, which in turn drive potentiometers 22 and 23, respectively. Thus, the voltage output from potentiometer 22 is equivalent to $\alpha_p - \alpha_o$, while the voltage output from potentiometer 23 is equivalent to $\beta_p - \beta_o$.

Meanwhile shaft rotations 24 through 29 are fed from input controls 3 to potentiometers 30 through 35. These potentiometers, 30 through 35, are energized by signals from double pole switches 36 through 41, each of which is positioned from manual controls 3. The poles of switches 37, 39, and 41 are energized by signals indicative of $+Y_p$ or $-Y_p$ from amplifiers 44 and 45, respectively, in the manner shown, while the poles of switches 36, 38, and 40 are energized by signals indicative of $+X_p$ or $-X_p$ from amplifiers 42 and 43, respectively. Thus the ouput voltages from potentiometers 30 through 35 provide the factors $X_p \cos \phi$ and $Y_p \sin \phi$, of the proper sign to their appropriate quadratic equation solvers 46, 47, and 48, which solve Equations 3, 4, and 5, respectively. Mechanical couplings 49, 50, and 51 feed shaft rotations proportional to $$\frac{1}{2D_1}, \frac{1}{2D_2}, \text{ and } \frac{1}{2D_m}$$

to quadratic solvers 46, 47, and 48, respectively. Each quadratic equation solver is also fed a signal proportional to $X_p^2 + Y_p^2$ from summing amplifier 52 via lines 52a. Thus all the values required to solve Equations 3, 4, and 5 for $\Delta D_1$, $\Delta D_2$, and $\Delta D_m$ are fed to quadratic equation solvers 46, 47, and 48, respectively.

The outputs from the quadratic equation solvers 46 and 47, which are indicative of $\Delta D_1$ and $\Delta D_2$, respectively, are fed to double pole double throw switch 53 which is positioned by mechanical coupling 54 from manual input controls 3. Thus the outputs from quadratic equation solvers 46 and 47 are each fed to different ones of summing networks 55 and 56 of servo amplifiers 57 and 58, respectively, depending upon the position of switch 53. Manual coupling 54 also positions double pole double throw switch 59 applying the outputs from the $(\alpha_p - \alpha_o)$ potentiometer 22 and the $(\beta_p - \beta_o)$ potentiometer 23 to different ones of summing networks 55 and 56 so that $\alpha_p - \alpha_o$ and $\Delta D_1$ are applied to one of the summing networks 55 or 56 and $(\beta_p - \beta_o)$ and $\Delta D_2$ are applied to the other, depending upon which set to the hyperbolic lines running through map 1, shown in FIG. 1, is more parallel to the north direction N. If the $\alpha$ hyperbolic lines (broken lines) are more parallel to the north direction than the $\beta$ hyperbolic lines, switches 53 and 59 should be positioned so as to apply $\alpha_p - \alpha_o$ and $\Delta D_1$ to summing network 55 and $\beta_p - \beta_o$ and $\Delta D_2$ to summing network 56.

Summing networks 55 and 56 are each also fed a signal voltage proportional to $\Delta D_m$ from quadratic equation solver 48. The outputs summing networks 55 and 56 are coupled to servo amplifiers 57 and 58, respectively, in such a manner that the output voltages from servo amplifiers 57 and 58 energize servomotors 60 and 61, respectively, causing these motors to turn at a speed proportional to the voltage output from its associated servo amplifier. The outputs of motors 60 and 61 are coupled to arms 62 and 63 of potentiometers 64 and 65, respectively, while the output of servomotor 61 is coupled to arms 66 and 67 of potentiometers 68 and 69, respectively. Opposite ends of potentiometers 64 and 68 are applied opposite polarity A.C. signals, while the center tap of each of potentiometers 64, 65, 68, and 69 is grounded. Thus the signal applied from potentiometer arm 66 to amplifier 45 is proportional to $+Y_p$, while the signal applied from potentiometer arm 62 to amplifier 43 is proportional to $+X_p$ and the output from amplifier 43 is indicative of $-X_p$, while the output of amplifier 45 is indicative of $-Y_p$. The actions of amplifiers 42 and 44, which are coupled to the outputs of amplifiers 43 and 45, respectively, are merely to change the sign of $X_p$ or $Y_p$ providing signals indicative of $+X_p$ and $-X_p$ to opposite terminals of potentiometer 65 and signals of $+Y_p$ and $-Y_p$ to opposite terminals of potentiometer 69. Thus the voltage in arm 63 of potentiometer 65 is proportional to $X_p^2$ and the voltage in arm 67 of potentiometer 69 is proportional to $Y_p^2$. Arms 63 and 67 feed voltage signals to summing amplifier 52 wherein $X_p^2$ and $Y_p^2$ are added and their sum then fed to each of quadratic equation solvers 46, 47, and 48. The outputs of amplifiers 44 and 45 are each fed to one pole or the other of the poles of double pole switches 37, 39, and 41, while the outputs of amplifiers 42 and 43 are each fed to one or the other of the poles of double pole switches 36, 38, and 40. The output of amplifiers 42 and 44 also provide signals to $X_p$ indicator 13 and $Y_p$ indicator 14, respectively.

The field coils of servomotors 60 and 61 are energized by signals from double pole double throw switch 70 so that depending upon the position of switch 70, a given signal to each servomotor from its associated servo amplifier will cause the motor to rotate in one direction or the other. Double pole double throw switch 70 is positioned by mechanical linkage 71, which is operated from manual input controls 3 depending upon the operation of the position computer as evidenced by $X_p$ and $Y_p$ indicators 13 and 14, respectively. If these indicators present values of $X_p$ and $Y_p$ which appear unstable or change considerably more than is expected from the motion of the Loran receiver when switch 70 is in one position, then switch 70 should be positioned in its other position. Potentiometers 30 and 31, 32 and 33, and 34 and 35 are mechanically driven from manual input controls 3 to yield the sine or cosine function of angles $\phi_1$, $\phi_2$, and $\phi_m$, respectively, by mechanical couplings 24 to 29, respectively, as shown in FIG. 3A. Since the angles $\phi_1$, $\phi_2$, and $\phi_m$ are known (see FIG. 1) when the Loran receiver 8 is located in any particular map 1 having its center at known point O, the sine and cosine functions of angles $\phi_1$, $\phi_2$, and $\phi_m$ are also known and may be inserted by the appropriate mechanical couplings 24 to 29.

Referring next to FIG. 4, there is shown a detail electrical schematic of one of quadratic equation solvers 46, 47, or 48. For purposes of explanation assume this is quadratic equation solver 46 which solves Equation 3 yielding a signal indicative of $\Delta D_1$. The inputs to quadratic solver 46 are mechanical coupling 49, voltage signals from potentiometers 30 and 31 via lines 30a and 31a and a voltage signal from summing amplifier 52, via line 52a. Lines 30a and 31a are coupled to different terminals of input network 78, thereby feeding voltage signals proportional to $X_p \cos \phi_1$ and $Y_p \sin \phi_1$ from potentiometers 30 and 31, respectively, to input network 78. Other inputs to network 78 are a signal from line 79 indicative of $$\frac{X_p^2 + Y_p^2 - \Delta D_1^2}{2D_1}$$

and a signal via line 80 proportional to $\Delta D_1$ as shown. Summing network 78 serves to sum the aforementioned voltage signals applying a sum voltage signal to servo amplifier 81, which in turn is coupled to and energizes servomotor 82. Motor 82 drives potentiometer arms 83 and 84 of potentiometers 85 and 86, each of which has its center tap connected to ground. Potentiometer 85 has its ends coupled to opposite A.C. polarities, and the voltage in arm 83, which is coupled to input network 87 and thence to amplifier 88 and which is indicative of $\Delta D_1$, is reversed in polarity at the output of amplifier 88; thus, the output of amplifier 88 is indicative of $-\Delta D_1$. This $-\Delta D_1$ output is fed to input network 89 of amplifier 90 and also to one end of potentiometer 86, while the output of amplifier 90, which is indicative of $+\Delta D_1$, is fed to the other end of potentiometer 86. The $+\Delta D_1$ output of amplifier 90 is fed back to input network 78 via line 80; thus, the action of shaft rotation from motor 82 coupled to arm 84 which is proportional to $\Delta D_1$ serves to multiply the shaft rotation times the voltage applied to the terminals of potentiometer 86, yielding a signal in line 91 which is proportional to $\Delta D_1^2$. Lines 91 and 52a are coupled to input network 92 of amplifier 93 whose output is proportional to the sum of voltages in lines 91 and 52a and thus the sum of $(X_p^2+Y_p^2+\Delta D_1^2)$. The output of amplifier 93 is fed to one terminal of potentiometer 94 whose arm 95 is positioned by shaft 49 whose rotation is indicative of $$\frac{1}{2D_1}$$

Thus, the voltage in arm 95, which is coupled to line 79, is indicative of $$\frac{X_p^2+Y_p^2+\Delta D_1^2}{2D_1}$$

The output voltage of quadratic equation solver 46 which is proportional to $\Delta D_1$ is obtained from arm 83 of potentiometer 85 and is fed to one arm of double pole double throw switch 53 shown in FIG. 3.

While I have described above the principles of this invention in connection with specific apparatus, it is to be clearly understood that this description is made only by way of example and not as a limitation to the scope of my invention as set forth in the objects thereof and in the accompanying claims.

I claim:

1. A radio navigation receiver adapted to be carried on a craft and cooperating with a plurality of Loran beacons for indicating in Cartesian coordinates the displacement of said craft with respect to a known point which may be selected to be one of said plurality of Loran beacons comprising means for receiving signals from said beacons, means for deriving from the received signals measured distance difference signals indicative of the craft's position relative said known point, means for generating hyperbolic coordinate signals indicative of the position of said known point, means to generate assumed signals indicative of the Cartesian coordinates of said craft's displacement relative to said known point, means for computing from said assumed signals, other signals indicative of the differences between the craft's distance to each said beacon and the distance from said known point to each said beacon, means to compare these computed difference distance signals with the measured distance difference signals indicative of the craft's position relative said known point and the position of said known point to yield error signals, and means for applying the error signals to said assumed signals' generating means to correct said assumed signals so as to drive said generating means to values more precisely indicative of the Cartesian coordinates representing the displacement of the craft's position from the known point.

2. A radio navigation receiver adapted to be carried on a craft and cooperating with a plurality of Loran beacons for indicating in Cartesian coordinates the displacement of said craft with respect to a known point which may be selected to be one of said plurality of Loran beacons comprising means for receiving signals from said beacons, means for deriving from the received signals measured distance difference signals indicative of the craft's position relative said known point, means for generating hyperbolic coordinate signals indicative of the position of said known point, means to generate assumed signals indicative of the Cartesian coordinates of said craft's displacement relative to said known point, means for generating signals representing the polar coordinates of said point with respect to said beacons, means for computing from said assumed signals and said generated polar coordinate signals the differences in the distances of the known point and the craft to each of said beacons, means for computing from these distance differences and said measured distance difference signals of said craft and said point the errors in the values of the assumed signals and for producing error signals representative thereof and means for applying said error signals to said assumed signals' generating means to correct the values of the Cartesian coordinates produced thereby.

3. A system according to claim 2, further including indicating means coupled to said assumed signals' generating means for indicating said Cartesian coordinates.

4. A radio navigation receiver adapted to be carried on a craft and cooperating with a plurality of Loran beacons for indicating in Cartesian coordinates the displacement of said craft with respect to a known point which may be selected to be one of said plurality of Loran beacons comprising means for receiving signals from said beacons, means for deriving from the received signals a pair of time difference signals with one of said time difference signals representing the difference in time between signals received from a first pair of said beacons and the other time difference signal representing the difference in time between signals received from a second pair of said beacons, means to generate a second pair of time difference signals representing similar time difference signals at the known point, means for generating assumed signals indicative of the Cartesian coordinates representing the displacement of the craft from the known point, means for generating polar coordinates representing the position of said point with respect to said beacons, means for computing from said assumed signals and said polar coordinate signals the differences in the distances of the known point and the craft to each of said beacons and producing computed distance difference signals representative thereof, means for computing from these computed distance difference signals and the time difference signals of said craft and said point error signals representing the error in the values of said assumed signals, and means for applying said error signals to said assumed signals' generating means to correct the values of said assumed signals so that said assumed signals more precisely correspond to the said Cartesian coordinates of said craft with respect to said known point signals.

5. A system according to claim 4, wherein said means for receiving comprises means for receiving signals from a first, second, and third beacon and wherein said first and second beacons form one of said pairs, and said second the third pairs form the other of said pairs.

6. A radio navigation receiver adapted to be carried on a craft and cooperating with a plurality of Loran beacons for indicating in Cartesian coordinates the displacement of said craft with respect to a known point which may be selected to be one of said plurality of Loran beacons comprising means for receiving signals from said beacons, means for deriving from the received signals a pair of time difference signals with one of said time difference signals representing the difference in time between signals received from a first pair of said beacons and the other time difference signal representing the difference in time between signals received from a second pair of said beacons, means to generate a second pair of time difference signals representing similar time difference signals at the known point, means for comparing the received time difference signal and the generated time difference signal of one pair of beacons to produce a first signal, means to compare the received time difference signal and the generated time difference signal of the other pair of beacons to produce a second signal, means to produce assumed signals indicative of the Cartesian coordinates representing the displacement of the craft from the known point, means for generating further signals representing the polar coordinates from the known point to the different beacons forming said pairs, means for computing from the assumed signals and said further known signals the differences in the distances of the known point and the craft to each of the beacons forming said pairs and producing signals representing each of said distance differences, means for taking the difference between different pairs of said distance difference signals to provide a third and fourth signal derived respectively from said first and second pairs of beacons, means for comparing said third and fourth signals with said first and second signals, respectively, to produce error signals and means for applying these error signals to correct the assumed signals until a null is reached, the corrected assumed signals representing more precisely the Cartesian coordinates expressing the displacement of the craft from the known point.

References Cited in the file of this patent

UNITED STATES PATENTS

| | | |
|---|---|---|
| 2,472,129 | Streeter | June 7, 1949 |
| 2,581,438 | Palmer | Jan. 8, 1952 |
| 2,717,735 | Luck | Sept. 13, 1955 |